United States Patent
Huber et al.

(10) Patent No.: US 9,422,759 B2
(45) Date of Patent: Aug. 23, 2016

(54) DEVICE FOR THE OPERATION OF AN ELECTRICAL LOAD ARRANGED IN AND/OR ON A MOVABLE TRANSPARENT PLANAR ELEMENT

(75) Inventors: Bernd Huber, Aidlingen (DE); Bernd Schoenhardt, Leonberg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/822,368

(22) PCT Filed: Oct. 7, 2011

(86) PCT No.: PCT/EP2011/005007
§ 371 (c)(1),
(2), (4) Date: Jul. 2, 2013

(87) PCT Pub. No.: WO2012/069107
PCT Pub. Date: May 31, 2012

(65) Prior Publication Data
US 2013/0283698 A1      Oct. 31, 2013

(30) Foreign Application Priority Data
Nov. 24, 2010   (DE) .................. 10 2010 052 411

(51) Int. Cl.
*E05F 11/44*   (2006.01)
*H02G 11/00*   (2006.01)
*H05B 3/84*    (2006.01)
(Continued)

(52) U.S. Cl.
CPC .............. *E05F 11/445* (2013.01); *E05F 15/689* (2015.01); *H02G 11/00* (2013.01); *H05B 3/84* (2013.01); *E05F 11/423* (2013.01); *E05Y 2201/434* (2013.01); *E05Y 2400/654* (2013.01); *E05Y 2600/46* (2013.01); *E05Y 2900/55* (2013.01); *H05B 2203/016* (2013.01)

(58) Field of Classification Search
CPC ..... E05F 11/44; E05F 11/445; E05F 15/1669; E05F 15/689
USPC ................. 49/324, 348, 349, 350, 351, 358
See application file for complete search history.

(56) References Cited

U.S. PATENT DOCUMENTS

| | | | |
|---|---|---|---|
| 1,942,962 A | * | 1/1934 | Hart ......................... 192/223.3 |
| 3,247,616 A | * | 4/1966 | Peras ............................. 49/40 |
| 3,629,783 A | | 12/1971 | Holzwarth et al. |

(Continued)

FOREIGN PATENT DOCUMENTS

| | | |
|---|---|---|
| DE | 2 034 514 A1 | 3/1971 |
| DE | 10 2006 061 641 B4 | 9/2009 |

(Continued)

OTHER PUBLICATIONS

International Search Report with English translation dated Jan. 6, 2012 (four (4) pages).

(Continued)

*Primary Examiner* — Katherine Mitchell
*Assistant Examiner* — Marcus Menezes
(74) *Attorney, Agent, or Firm* — Crowell & Moring LLP

(57) ABSTRACT

A device for the operation of an electrical load is arranged in and/or on a movable transparent panel element. A supply and/or signal line is arranged between at least one energy source and the electrical load. The supply and/or signal line is arranged on a lever assembly, and can be guided by the lever assembly.

8 Claims, 3 Drawing Sheets

Figure 1:
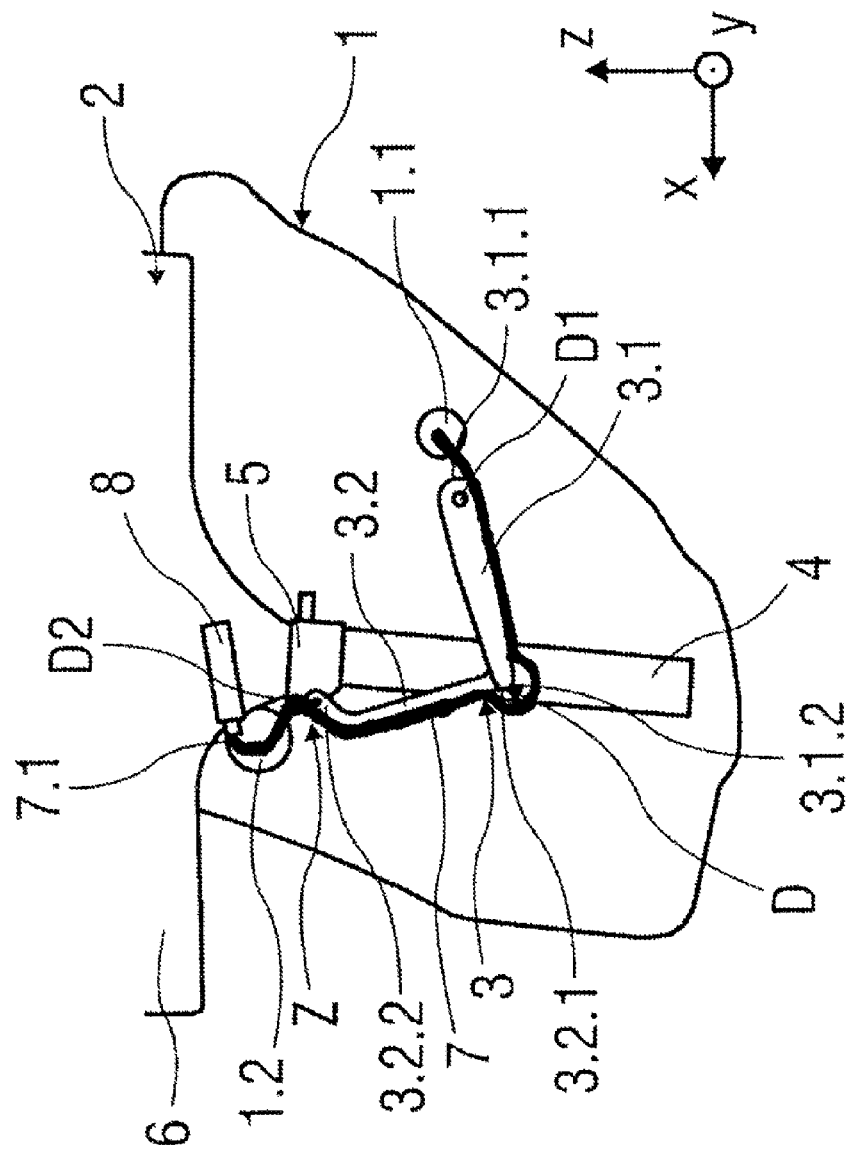

(51) Int. Cl.
*E05F 15/689* (2015.01)
*E05F 11/42* (2006.01)

(56) References Cited

U.S. PATENT DOCUMENTS

| | | | | |
|---|---|---|---|---|
| 4,125,966 | A * | 11/1978 | Penn | 49/378 |
| 4,151,683 | A * | 5/1979 | Narita et al. | 49/502 |
| 4,930,255 | A * | 6/1990 | Sea | B60J 1/17 49/349 |
| 4,939,867 | A * | 7/1990 | Harada et al. | 49/349 |
| 5,074,076 | A * | 12/1991 | Baloche | E05F 11/445 49/351 |
| 5,309,677 | A * | 5/1994 | Kunert et al. | 49/349 |
| 5,513,468 | A * | 5/1996 | Diestelmeier | E05F 11/385 49/351 |
| 5,821,904 | A * | 10/1998 | Kakizawa et al. | 343/704 |
| 7,739,837 | B2 * | 6/2010 | Suzuki et al. | 49/351 |
| 8,153,897 | B2 * | 4/2012 | Yamamoto | 174/72 A |
| 8,381,848 | B2 * | 2/2013 | Asbach et al. | 180/65.1 |
| 2004/0221509 | A1 * | 11/2004 | Shibata et al. | 49/350 |
| 2005/0091929 | A1 * | 5/2005 | Shibata | 49/350 |
| 2007/0148994 | A1 | 6/2007 | Sato et al. | |

FOREIGN PATENT DOCUMENTS

| | | |
|---|---|---|
| DE | 10 2009 036 267 A1 | 2/2011 |
| EP | 2 034 581 A1 | 3/2009 |
| JP | 61-60345 A | 3/1986 |
| JP | 10-175483 A | 6/1998 |

OTHER PUBLICATIONS

German-language Written Opinion (PCT/ISA/237) (five (5) pages).
German Search Report with partial English translation dated Jul. 28, 2011 (ten (10) pages).

* cited by examiner

DEVICE FOR THE OPERATION OF AN ELECTRICAL LOAD ARRANGED IN AND/OR ON A MOVABLE TRANSPARENT PLANAR ELEMENT

BACKGROUND AND SUMMARY OF THE INVENTION

Exemplary embodiments of the present invention relate to a device for the operation of an electrical load arranged in and/or on a movable transparent panel element, wherein a supply/signal line is arranged between at least a source of energy and the electrical load.

German Patent Document 10 2009 036 267.3 describes a pane, in particular a transparent, movable pane for a vehicle with an electrically switchable field of view, specifically one that may be darkened, lightened, or heated, and which may be connected to an electrical supply with at least one cable. A winding reel is provided for the partial storage of the cable, with the cable capable of being wound on or off the reel as the position of the pane changes. The winding reel may be operated by means of a spring element and/or an electric motor.

Exemplary embodiments of the present invention are directed to a device for the operation of an electrical load arranged in and/or on a movable panel element that is improved vis-à-vis the prior art.

In a device for the operation of an electrical load arranged in and/or on a movable transparent panel element, a supply/signal line is arranged between at least a source of energy and the electrical load. According to the invention, the supply and/or signal line is attached to and can be guided by a lever assembly.

By means of the lever assembly, which is attached to and serves to guide the supply and/or signal line, mechanical strains such as e.g. tensile, bending, or torsional forces acting on the supply and/or signal line are reduced in a particularly advantageous manner as compared to a winding reel known from the prior art.

The movable transparent panel element is, in particular, a vehicle window pane or a sunroof, with the electrical load being an electrical consumer such as e.g. a heating element and/or an element having a transmission factor that may be modified by the application of an electrical voltage. The supply and/or signal line serves to conduct the electrical voltage, the supply and/or signal line being electrically insulated.

The lever assembly preferably comprises a first lever and a second lever, with a first end of the first lever being rotatably mounted on a door module base support. The first lever is thus mounted on the door module base support such as to be rotatable around an axis.

The second lever is rotatably mounted on a second end of the first lever, advantageously forming a pivot joint. A second end of the second lever is rotatably mounted on the movable transparent panel element and/or on an element attached to the transparent panel element, such that the second lever is rotatably mounted around another axis.

By means of the lever assembly comprising the two levers, it is possible in a particularly advantageous manner to convert a circular motion of the individual levers into a linear motion, permitting the supply and/or signal line to be guided without bending or damage according to the linear motion of the transparent panel element. The supply of electric current to e.g. the electric load is thus ensured over a relatively long period of time.

It is particularly preferable for the element on which the first end of the second lever is mounted to be a carrier of a window regulator mechanism. This carrier is movably mounted on a straight guiderail in such a manner that a linear motion of the transparent panel element may be effected; this carrier can be an electric motor. The carrier is retained against the guiderail such that it may move in a linear motion, with the transparent panel element attached directly to the carrier. By means of this attachment, the motion of the carrier is transmitted to the transparent panel element.

The first end of the second lever is rotatably attached to the carrier of the window regulator assembly such that the lever assembly may also move in conjunction with the linear motion of the carrier. If the carrier executes the linear motion, this motion may be transmitted to the second lever and thus to the lever assembly, such that the supply and/or signal line may be guided according to the linear motion of the carrier without being subjected to mechanical stresses.

If the movable transparent panel element is a side window pane, the opening and closing of the vehicle window pane may be effected by means of the carrier movably connected to the guiderail.

The supply and/or signal line is affixed to the lever assembly by means of bonding, force-locking, or a positive connection, with the supply and/or signal line largely extending along a long side of the relevant lever by means of the connection method in question. By way of example, the supply and/or signal line is affixed to the levers by means of brackets. Alternatively or in addition, the supply line may be glued to the long side of the levers.

It is particularly preferable for the supply and/or signal line to be affixed to the long sides of the levers by means of clips and/or brackets. By means of the clips and/or brackets, the supply and/or signal line can easily be removed from and reattached to the lever assembly without the aid of tools. Thus, should the supply and/or signal line be found to be faulty, it can be replaced with little effort. For levers made of plastic, a labyrinth installation of the supply and/or signal line along at least one of the levers may further be effected affordably and without the need for additional elements.

The device according to the invention is a relatively inexpensive solution for the operation of an electrical load arranged in and/or on the movable transparent panel element, as two levers and some number of bearing surfaces are the only additional components required to effect the guiding of the supply and/or signal line.

BRIEF DESCRIPTION OF THE DRAWING FIGURES

Figure 2:
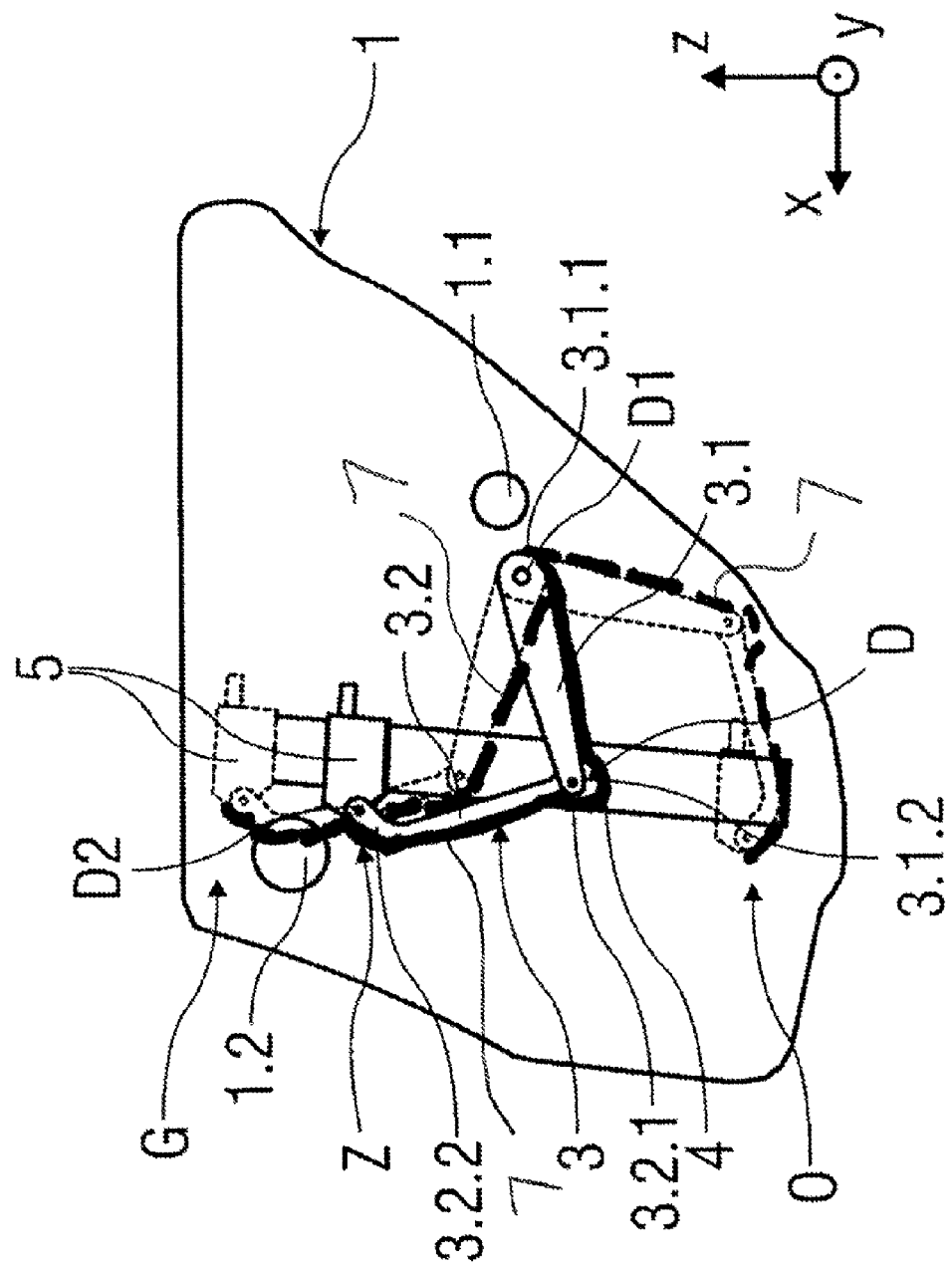
Figure 3:
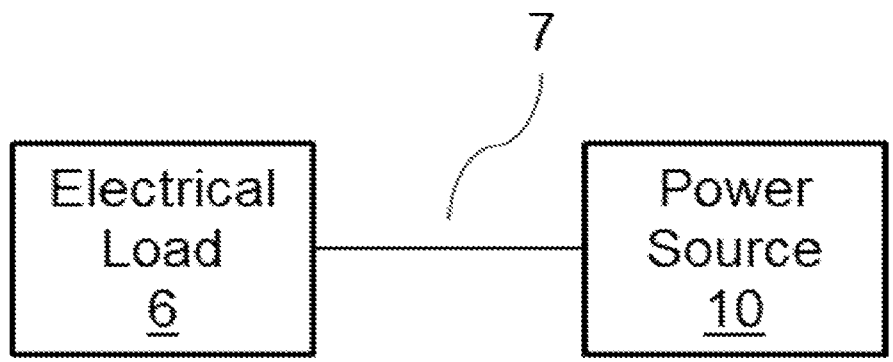

Exemplary embodiments of the invention are further detailed below by means of drawings:

Shown are the following:

FIG. 1 a schematic drawing of a door module base support with a movable transparent panel element and a lever assembly according to the invention, FIG. 2 a schematic drawing of the door module base support and the lever assembly in various positions, and FIG. 3 a highly schematic diagram illustrating a supply line arranged between a source of energy and an electrical load.

The same reference numerals are used for equivalent components in all figures.

DETAILED DESCRIPTION

FIG. 1 shows a door module base support 1 for a vehicle door with a section of a movable transparent panel element 2 and a lever assembly 3 according to the invention. The transparent panel element 2 is depicted in an intermediate position Z, while the door module base support 1 is depicted from the perspective of a "wet area" of the vehicle door, i.e. an area exposed to moisture.

The movable transparent panel element 2 is a glass surface, i.e. a vehicle window pane, which may be moved from an open position 0, detailed in FIG. 2, to a closed position G by means of a control element located inside the vehicle and not further described. The transparent panel element 2 may be held in any desired intermediate position Z between the open position O and the closed position G.

In order to effect the motion of the transparent panel element 2, a vertical guiderail 4 is mounted on the door module base support 1. A carrier 5 of a window regulator assembly is attached to the transparent panel element 2, with the carrier 5 capable of being driven by an electric motor. The carrier 5 is coupled to the transparent panel element 2.

A system of toothing (not shown) is formed along at least one long side of the guiderail 4, which interlocks with the gear teeth (not shown) of a gearwheel of the carrier 5. If the control element located inside the vehicle is activated, the carrier 5 is triggered and supplied with electrical energy, causing the gearwheel of the carrier 5 to rotate. By means of the interlocking gear teeth, a linear motion of the carrier 5 along the guiderail 4 is effected, and thus also of the transparent panel element 2, which moves e.g. from the closed position G to the open position O.

If an intermediate position Z of the transparent panel element 2 is desired, the control element is activated until the desired intermediate position Z is reached. When the control element is not activated, the carrier 5 stops, thus the gearwheel does not rotate and the carrier 5 and therefore also the transparent panel element 2 are held in position by the interlocking gear teeth.

In place of the method of power transmission via interlocking gear teeth described above, it would also be possible to effect the power transmission by means of a cable pull.

An electrical load 6 is arranged in or on the movable transparent panel element 2. The electrical load 6 is an element having a transmission factor that may be modified by the application of an electrical voltage.

Alternatively or in addition, a heating element e.g. may be arranged as an electrical load 6 on and/or in the transparent panel element 2.

As illustrated in a highly schematic form in FIG. 3, a supply and/or signal line 7 is provided to supply the electrical load 6 with electrical voltage, such supply and/or signal line being arranged between an energy source 10, e.g. a vehicle battery, and the electrical load 6.

The supply and/or signal line 7 is led through an opening 1.1 in the door module base support 1, e.g. via a sealing grommet located there, from a dry area into the wet area of the vehicle door.

A first end 7.1 of the supply and/or signal line 7 is connected to a transformer 8 by means of which an operating voltage of the electrical load 6 may be controlled.

In order to avoid subjecting the supply and/or signal line to mechanical strains, e.g. tensile, bending, and/or torsional forces, when the transparent panel element 2 is moved, it is intended according to the invention that the supply and/or signal line be guided by means of the lever assembly 3.

The lever assembly 3 comprises a first lever 3.1 and a second lever 3.2. A first end 3.1.1 of the first lever 3.1 is preferably arranged on the door module base support 1 in direct proximity to the opening 1.1 through which the supply and/or signal line 7 is led into the wet area. In FIG. 1 the size of the supply and/or signal line 7 is exaggerated to highlight the distinction between the supply and/or signal line 7 and the side of the first lever 3.1 and second lever 3.2 along which the supply and/or signal line 7 runs. The first lever 3.1 is rotatably mounted around an axis of rotation D1 on the door module base support 1 by means of its first end 3.1.1, such that a rotation of the first lever 3.1 in an X-Z plane may be effected.

On a second end 3.1.2 of the first lever 3.1, the second lever 3.2 is rotatably mounted by means of its first end 3.2.1, such that a pivot joint D is formed. The first lever 3.1 and the second lever 3.2 may be rotated against one another in the X-Z plane by means of the pivot joint D.

A second end 3.2.2 of the second lever 3.2 is rotatably attached to the carrier 5 of the window regulator assembly, such that the second lever 3.2 is rotatably mounted around a second axis of rotation D2 in the X-Z plane. The second lever 3.2 is formed in an angled manner toward its second end 3.2.2, simplifying at least the attachment of the second lever 3.2 to the carrier 5.

The supply and/or signal line 7 led through the opening 1.1 is preferably secured in place by means of clips and brackets (not shown) along the long sides of the first lever 3.1 and of the second lever 3.2. In the immediate proximity of the pivot joint D, the supply and/or signal line 7 is not affixed to the levers 3.1, 3.2, but spaced away from them. With levers made from plastic, a labyrinth installation of the supply and/or signal line 7 along the first lever 3.1 and/or the second lever 3.2 may further be effected affordably and without the need for additional elements.

Due to the fact that the supply and/or signal line 7 is affixed to the levers 3.1, 3.2 by means of clips and brackets, the supply and/or signal line can easily be attached to and removed again from the levers 3.1, 3.2, so that the supply and/or signal line 7 may be replaced with little effort.

The first lever 3.1 and the second lever 3.2 are made of a relatively sturdy material, so that the lever assembly 3 does not vibrate when subjected to impulses, i.e. motions, with respect to a Y axis running perpendicular to the X-Z plane. The generation of noise as a result of the levers 3.1, 3.2 striking e.g. the door module base support 1 is thereby prevented or at least minimised.

When the vehicle door is assembled and installed, the door module base support 1 is assembled, i.e. the guiderail 4 and the lever assembly 3 are attached to the door module base support 1. The carrier 5 of the window regulator assembly is arranged on the guiderail 4 in such a way that the second end 3.2.2 of the second lever may be rotatably attached to the carrier 5. The carrier 5 is attached so as to be operable, such that the linear movement of the carrier 5 along the guiderail 4 may be effected.

The transparent panel element 2 with its attached transformer 8 for controlling the operating voltage of the electrical load 6 is then installed and moved to the closed position G by means of the carrier 5. The first end 7.1 of the supply and/or signal line 7 is quickly attached to the carrier 5 or the door module base support 1 in direct proximity to the carrier 5, with the contacting of the supply and/or signal line 7 with the transformer 8 being effected through an installation opening 1.2 of the door module base support 1.

The installation opening 1.2 is then closed with a standard sealing cap, not further described.

FIG. 2 depicts the door module base support 1 with the lever assembly 3 according to the invention for guiding the supply and/or signal line 7.

The transparent panel element 2 with the transformer 8 arranged thereon are not shown in FIG. 2. The supply and/or signal line 7 is illustrated with an exaggerated size in FIG. 2 to highlight the distinction between the supply and/or signal line 7 and the side of the first lever 3.1 and second lever 3.2 along which the supply and/or signal line 7 runs.

A dashed line is used to show an open position O and a closed position G of the transparent panel element 2 that may be achieved by means of the carrier 5, with the intermediate position 7 according to FIG. 1 depicted with a solid line.

The second end 3.2.2 of the second lever 3.2 is rotatably mounted on the carrier 5 in such a way that the second lever 3.2, at least in the open position O of the transparent panel element 2 in which the carrier 5 is located at a lowest position on the guiderail 4, may be guided past the carrier 5.

Throughout the operation of the movable transparent panel element 2, the supply and/or signal line 7 is affixed in place to the lever assembly 3. The first lever 3.1 and the second lever 3.2 pivot depending on the movement, i.e. the linear motion of the carrier 5 in the X-Z plane. As the lever assembly comprises the first lever 3.1 and the second lever 3.2, it is possible to convert a circular motion of an individual lever 3.1, 3.2 into a linear motion, which is transmitted to the lever assembly 3 through the movement of the carrier 5.

By means of the lever assembly 3 according to the invention, along which the supply and/or signal line 7 is affixed, the mechanical strain on the supply and/or signal line 7 is reduced to a minimum in comparison to the solution known from the prior art.

In addition, for the production and attachment of the lever assembly 3, only the first lever 3.1, the second lever 3.2, and some number of bearing surfaces are needed to arrange the lever assembly 3 on the door module base support 1 and the carrier 5. A relatively inexpensive solution for the operation of an electrical load 6 arranged in and/or on a movable transparent panel element 2 requiring a supply and/or signal line 7 for the supply of electrical power is thus provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device comprising:
   a lever assembly;
   a linear guiderail; and
   a carrier, comprising an electric motor, moveably mounted on the linear guiderail, wherein
      the device is arranged in or on a movable transparent panel element,
      a supply or signal line is arranged between at least one source of energy and an electrical load,
      the lever assembly has a first end coupled to the carrier and that is closer to the movable transparent panel element, and a second end that is closer to an opening in a door module base support,
      the supply or signal line is attached to the lever assembly and the lever assembly is configured to guide the supply or signal line such that the supply or signal line remains taut between the first end of the lever assembly and the movable transparent panel element,
      the lever assembly comprises a first lever and a second lever each having a first and second end portion,
      the first and second levers being coupled via a pivot joint having a pivot joint axis about which the pivot joint rotates and being arranged so that the pivot joint moves from a first position in which the pivot joint axis is offset with respect to the guiderail to a second position in which the pivot joint axis extends through the guiderail,
      the second lever has a first longitudinal axis and the second end portion of the second lever has a second longitudinal axis that forms an oblique angle with the first longitudinal axis such that the second end portion is curved in the direction of the carrier and connects to a side of the carrier, and
      the carrier is coupled to the moveable transparent panel element and the lever assembly so that linear movement of the carrier along the linear guiderail by the motor causes linear movement of the transparent panel element and circular movement of the first and second levers of the lever assembly.

2. The device according to claim 1, wherein the first end portion of the first lever is rotatably mounted on the door module base support, and the second lever is rotatably mounted on the second end portion of the first lever.

3. The device according to claim 1, wherein a bonded, force-locked, or form-fitting connection affixes the supply or signal line to the lever assembly.

4. The device according to claim 1, wherein the supply or signal line is affixed to the lever assembly by clips or brackets.

5. The device according to claim 1, wherein the transparent panel element is installed in a vehicle.

6. The device according to claim 1, wherein the transparent panel element is a vehicle window pane or a sunroof.

7. The device according to claim 1, further comprising a transformer coupled to the supply or signal line, wherein the transformer is arranged on the movable transparent panel element.

8. The device according to claim 1, wherein the first lever is pivotably connected to the second lever via the pivot joint such that the circular movement of the first and second levers moves the pivot joint from a position offset from the guiderail to a position that directly overlaps with the guiderail.

* * * * *